(12) United States Patent  
MacInnis

(10) Patent No.: US 8,194,732 B2
(45) Date of Patent: Jun. 5, 2012

(54) INTEGRATED CIRCUIT WITH CONVERSION CAPABILITY FOR PORTABLE MEDIA PLAYER

(75) Inventor: Alexander G. MacInnis, Ann Arbor, MI (US)

(73) Assignee: Broadcom Corporation, Irvine, CA (US)

( * ) Notice: Subject to any disclaimer, the term of this patent is extended or adjusted under 35 U.S.C. 154(b) by 976 days.

(21) Appl. No.: 12/180,316

(22) Filed: Jul. 25, 2008

(65) Prior Publication Data

US 2009/0034607 A1 Feb. 5, 2009

Related U.S. Application Data

(60) Provisional application No. 60/952,731, filed on Jul. 30, 2007.

(51) Int. Cl.
*H04N 11/02* (2006.01)

(52) U.S. Cl. .................................. 375/240.01

(58) Field of Classification Search ............ 375/240.01, 375/240.26; 341/50, 61, 88; 725/143, 151, 725/153
See application file for complete search history.

(56) References Cited

U.S. PATENT DOCUMENTS

| 6,263,503 | B1 * | 7/2001 | Margulis .......................... 725/81 |
| 6,937,168 | B2 * | 8/2005 | Rao et al. ......................... 341/50 |
| 7,565,674 | B2 * | 7/2009 | Motoe et al. ..................... 725/81 |
| 7,934,263 | B2 * | 4/2011 | Singer et al. ..................... 726/26 |
| 2008/0155230 | A1 * | 6/2008 | Robbins et al. ................... 712/1 |
| 2008/0263621 | A1 * | 10/2008 | Austerlitz et al. ............. 725/139 |
| 2008/0320543 | A1 * | 12/2008 | Wang et al. .................... 725/131 |
| 2009/0080870 | A1 * | 3/2009 | Mudie et al. .................... 386/131 |
| 2009/0097643 | A1 * | 4/2009 | Ramaswamy et al. ........ 380/200 |

FOREIGN PATENT DOCUMENTS

| CN | 1618225 | 5/2005 |
| JP | 20-0436088 | 5/2007 |
| KR | 100431955 | 5/2004 |
| KR | 100436088 | 6/2004 |

* cited by examiner

*Primary Examiner* — Frank Duong
(74) *Attorney, Agent, or Firm* — Thomas, Kayden, Horstemeyer & Risley, LLP

(57) ABSTRACT

Presented herein are system(s), method(s) and apparatus for an integrated circuit with conversion capabilities for transferring data to a portable media player. In one embodiment, there is presented an integrated circuit for providing video data. The integrated circuit comprises at least one input, at least one output, an encoder, and at least another output. At least one input receives video data. At least one output provides the video data to a display screen. The encoder encodes the video data into a particular compressed format. The at least another output for provides the video data in the particular compressed format to an interface.

20 Claims, 4 Drawing Sheets

INTEGRATED CIRCUIT WITH CONVERSION CAPABILITY FOR PORTABLE MEDIA PLAYER

RELATED APPLICATIONS

This application claims priority to "INTEGRATED CIRCUIT WITH CONVERSION CAPABILITY FOR PORTABLE MEDIA PLAYER", Provisional Application for U.S. Patent Ser. No. 60/952,731, filed Jul. 30, 2007 by MacInnis, and the foregoing application is incorporated herein by reference in its entirety for all purposes. This application is also related to "DISPLAY DEVICE WITH CONVERSION CAPABILITY FOR PORTABLE MEDIA PLAYER", Provisional Application for U.S. Patent Ser. No. 60/952,727, filed Jul. 30, 2007 by MacInnis, and "DISPLAY DEVICE WITH CONVERSION CAPABILITY FOR PORTABLE MEDIA PLAYER", U.S. application for patent Ser. No. 12/179,741, and the foregoing applications are incorporated herein by reference in its entirety for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Typical current TVs have the ability to receive, process and display audio-video (A/V) signals received from a variety of sources. Received signals may be analog, such as NTSC, or digital such as ATSC with MPEG-2 digital video and Dolby Digital audio. Some TVs can receive uncompressed digital or analog A/V input, e.g., via component analog or HDMI inputs.

Portable media players are becoming popular. Some portable media players (PMP) can display video. Video content for PMPs is typically downloaded via the Internet. Users may wish to record content received at their home TV and copy the content to their PMPs at very high speeds without having to pay for an extra copy of content to which they already have the rights to watch.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to system(s), method(s), and apparatus for integrated circuit(s) with conversion capabilities for personal media players, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

Figure 1:
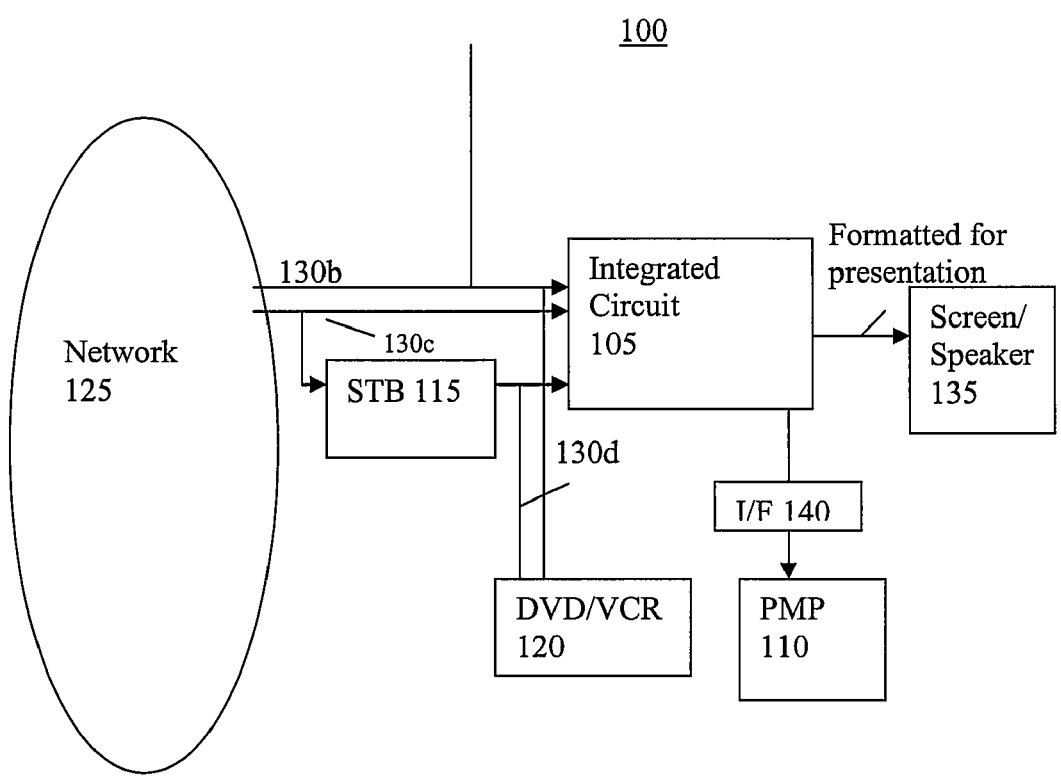
FIG. 1 is a block diagram of an exemplary system for providing media in accordance with an embodiment of the present invention.

Referring now to FIG. 1, there is illustrated a block diagram of an exemplary system 100 for providing data in accordance with an embodiment of the present invention. The system 100 comprises a screen/speaker 135 and a portable media player 110. The screen/speaker 135 receives and presents data.

An integrated circuit 105 provides formatted data for presentation on the screen/speaker 135. The data 130 can be video and/or audio data and can be received as analog signals 130b that are received either over radio waves, a network or a local connection, uncompressed digital signals, or compressed data. Where the data is compressed data, the data can be decompressed via a set top box 115, thereby resulting in decompressed data, or via decompression circuitry within the integrated circuit 105. Additionally, the integrated circuit 105 can receive data as either analog signals 130b or decompressed data 130d from a DVD/VCR player 120 or other source, such as a STB, PC, etc.

The integrated circuit 105 receives the data 130 (analog signals 130b, compressed data 130c, or the decompressed data 130d) and encodes or can transcode the data 130 into a particular format. Where the integrated circuit 105 receives compressed data 130c, the integrated circuit decompresses the compressed data 130c, thereby resulting in decompressed data. Additionally, the integrated circuit 105 may include circuitry for preparing and formatting the decompressed data for presentation. The IC 105 may include circuitry for encoding the decompressed data. Alternatively, the IC 105 may transcode the compressed data input 130c into a format suitable for a PMP. The transcoding operation may produce decompressed data. Alternatively, the transcoding operation may be performed without producing decompressed data.

Accordingly, the term "decompressed data" will now be understood to include, for example, reconstructed data from compressed data, uncompressed data, analog signals, uncompressed digital signals, scaled data, rasterized data, and data that is not compressed using lossy compression. The term "decompressed video data" will now be understood to include, for example, reconstructed video data from compressed video data, uncompressed video data, analog video signals, digital video signals, scaled video data, rasterized video data, and video data that is not compressed using lossy compression. The term "video data" shall be understood to cover any video in any form. "Decompressed audio data" shall be understood to include, for example, analog audio data, digitized analog audio data, reconstructed audio data from compressed audio data, and audio data that is not compressed using lossy compression. "Audio data" shall be understood to include any audio data in any form.

In certain embodiments of the present invention, the integrated circuit 105 can be connected to an input of the screen/speaker 135 by soldering the integrated circuit 105 onto a printed circuit board.

Additionally, the integrated circuit 105 includes circuitry integrated therein to encode the data into a format, encoded data 140, suitable for use by a personal media player 110. The integrated 105 can also include circuitry to encoded compressed data to the particular format, either by decompression and compression or by transcoding.

In certain embodiments of the present invention, the data can be transcoded from a first compression format to a second format, with or without decompressing the data. Accordingly, the term "encoding" shall be understood to include both coding uncompressed data, as well as transcoding compressed data, with or without first decoding. Accordingly, the term "encoder" shall be understood to mean a circuit that performs transcoding of compressed data and/or a circuit that performs coding of uncompressed data.

The portable media player 110 presents media on an integrated screen and/or via speakers and is generally designed to be routinely transported or carried on the person. The portable media player 115 can comprise, for example, an iPOD™, a cell phone, a personal digital assistant (PDA), or a Palm Top.

Since the portable media player 115 is generally designed to be routinely transported or carried on the person, the portable media player 115 can use a particular compression format for storing the media played by the portable media player to reduce the amount of memory needed to store the media. The particular format can also be one that simplifies the circuitry in the player and minimizes storage space, power consumption, and silicon area.

In certain embodiments of the present invention, the integrated circuit 105 can be soldered to a printed circuit board. An output of the integrated circuit 105 can be connected via a printed circuit board connection to an interface that is connectable to the portable media player 110. The interface can comprise, for example, a USB port, an infrared port, or a wireless transceiver. The integrated circuit 105, upon connection or establishment of a link with the personal media player 110 to the interface, can transfer the data encoded with the particular format to the portable media player 110. Alternatively, the integrated circuit 105 can have a transmitter integrated therein and the portable media player 110 can be equipped to detect a condition wherein the portable media player 110 is within local radio proximity of the integrated circuit 105, and transfer the encoded data 130 to the portable media player 110 over a radio interface. Alternatively, the transmission of data to the PMP might occur at some other time after the connection is made, e.g. when a desired program is being converted.

Figure 2:
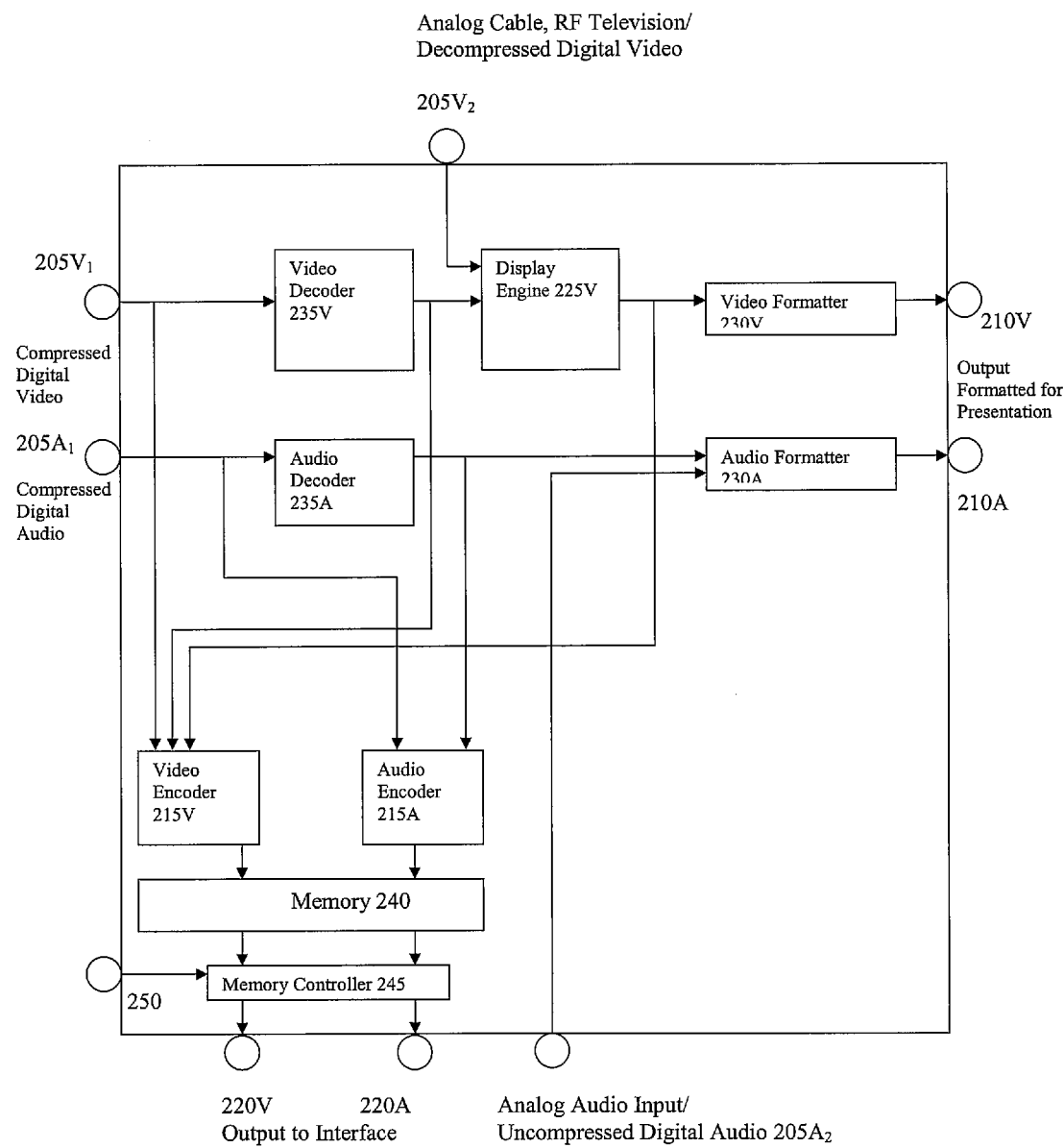
FIG. 2 is a block diagram of an exemplary display device in accordance with an embodiment of the present invention.

Referring now to FIG. 2, there is illustrated a block diagram of an exemplary integrated circuit 105 in accordance with an embodiment of the present invention. The integrated circuit comprises at least one input for receiving video data 205V, at least one output 210V for providing the video data to a display screen, a video encoder 215V for encoding the video data into a particular format, an audio encoder 215A for encoding the audio data into a particular format, and at least another output 220V for providing the video data in the particular format to an interface. In certain embodiments of the present invention, each of the inputs and outputs can correspond to an integrated circuit pin or set of pins.

In certain embodiments of the present invention, the integrated circuit 105 can receive decompressed video data at input $205V_2$. Input $205V_2$ can provide the decompressed video data to a display engine 225V and video formatter 230V. The display engine 225V and video formatter 230V format the decompressed video data for presentation on a display screen.

In certain embodiments of the present invention, the integrated circuit 105 can receive compressed video data at input $205V_1$. The input $205V_1$ provides the compressed video data to a video decoder 235. The video decoder decompresses the compressed video data, thereby resulting in decompressed video data. The display engine 225V and video formatter 230 receive the decompressed video data and format the video for presentation on a display screen.

Additionally, video encoder 215V encodes the video data into a format for use with a portable media player and writes the data into memory 240. In certain embodiments of the present invention, wherein the integrated circuit 105 receives compressed video data, the video encoder 215V can receive the compressed video data. The video encoder 215V can then transcode the compressed video data into a compressed format suitable for the PMP. Alternatively, the video encoder 215V can receive the decompressed video data from the video decoder 235V. In another embodiment, the video encoder 235V can receive the output of the display engine 225V.

A memory controller 245 retrieves the video data stored in the memory 240 and provides the video data to output 220V. In certain embodiments of the present invention, the memory controller 245 retrieves and provides the video data from the memory 240 to output 220V after receiving a control signal from an input 250.

The input 250 can be configured to detect the proximity of the portable media player to the integrated circuit 105. For example, the integrated circuit 105 can be connected to a detection circuit that detects when the portable media player is proximate to the integrated circuit 105 and provides the control signal to the input 250. For example, a USB port can include circuitry that detects the connection of a portable media player thereto. The circuitry can provide a signal to the input 250 upon detecting connection of the portable media player.

In certain embodiments of the present invention, the integrated circuit 105 can receive decompressed audio data at input $205A_2$. Input $205A_2$ can provide the decompressed audio data to an audio formatter 230A. Audio formatter 230A formats the decompressed audio data for presentation on speaker(s).

In certain embodiments of the present invention, the integrated circuit 105 can receive compressed audio data at input $205A_1$. The input $205A_1$ provides the compressed audio data to an audio decoder 235A. The audio decoder 235A decompresses the compressed audio data, thereby resulting in uncompressed audio data. The audio formatter 230A receives the uncompressed audio data and formats the audio data for presentation on speaker(s).

Additionally, audio encoder 215A encodes the audio data into a format for use with a portable media player and writes the data into memory 240. In certain embodiments of the present invention, wherein the integrated circuit 105 receives compressed audio data, the audio encoder 215A can receive the compressed audio data and transcode the compressed data to a format suitable for the PMP. Alternatively, the audio encoder 215A can receive the decompressed audio data from the audio decoder 235A. In another embodiment, the audio encoder 235A can receive the output of the audio formatter 230A.

A memory controller 245 retrieves the audio data stored in the memory 240 and provides the audio data to output 220A.

It is noted that a number of the foregoing components can be implemented as hardware accelerators or firmware executed on a processor.

Figure 3:
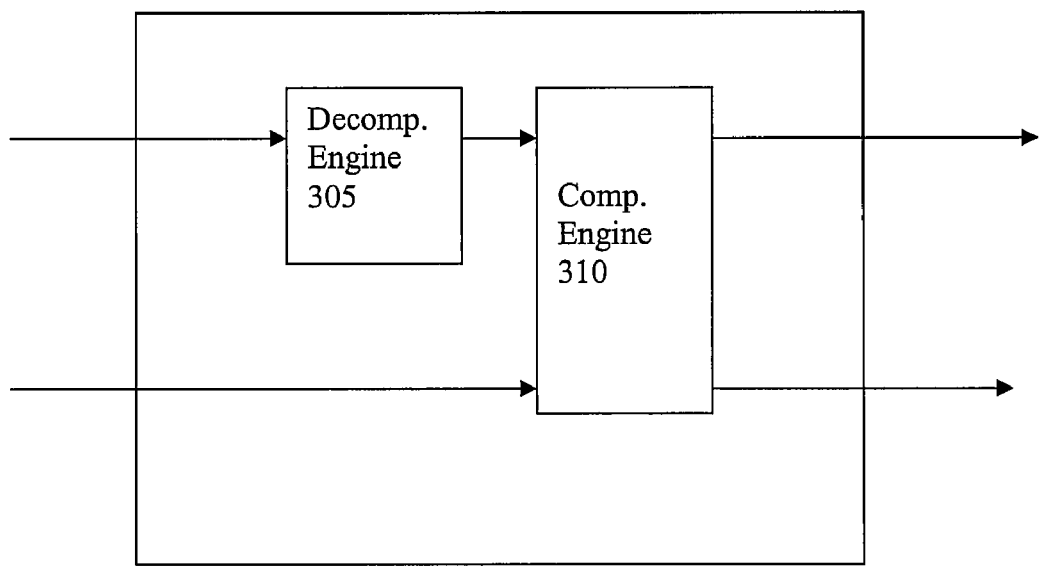
FIG. 3 is a block diagram of an exemplary display device receiving compressed data in accordance with an embodiment of the present invention in accordance with an embodiment of the present invention.

Referring now to FIG. 3, there is illustrated a block diagram of an exemplary encoder 215 in accordance with an embodiment of the present invention. In certain embodiment of the present invention, the encoder 215 can comprise an audio encoder 215A. Alternatively, in other embodiments of the present invention, the encoder 215 can comprise a video encoder 215V.

The encoder 215 can receive either compressed data or decompressed data. The encoder 215 comprises a decompression engine 305 and a compression engine 310. The decompression engine 305 receives the compressed data in accordance with a first compression format, and decompresses the compressed data. The compression engine 310 receives the decompressed data from the decompression engine 305. The compression engine 310 compresses the data in accordance with another compression format that is suitable for use with the portable media player.

In certain embodiments of the present invention, wherein the encoder 215 comprises an audio encoder 215A, the decompression engine 305 can comprise an audio decompression engine and the compression engine 310 can comprise an audio compression engine. Alternatively, in certain embodiments of the present invention, wherein the encoder 215 comprises a video encoder 215V, the decompression engine 305 can comprise a video decompression engine and the compression engine 310 can comprise a video compression engine.

An audio compression engine can use a variety of techniques to compress the audio data, such as various coding and time to frequency transformation such as the Inverse Modified Discrete Cosine Transformation (IMDCT). A video decompression engine can use a variety of techniques to compress video data such as entropy coding, motion compensation, and transformations, such as the Discrete Cosine Transformation or the Hadamard Transformation. In certain embodiments of the present invention, a video compression engine can use MPEG-2, or Advanced Video Coding (also known as MPEG-4, Part 10, or H.264). In certain embodiments of the present invention, an audio compression engine can use MPEG-1 or MP3 to compress the audio data.

Figure 4:
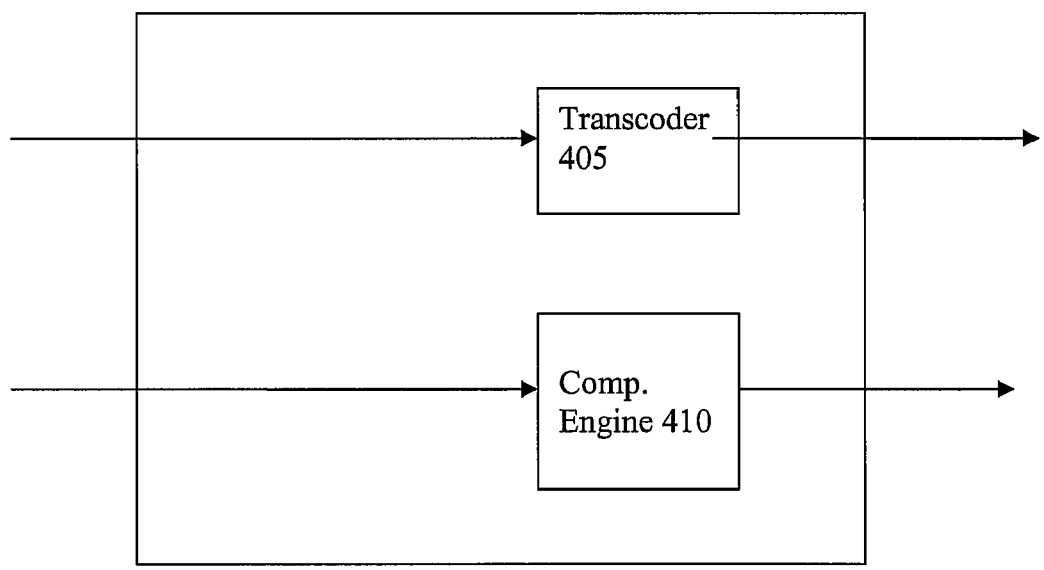
FIG. 4 is a block diagram of an exemplary display device operable to transfer data over a wireless connection in accordance with an embodiment of the present invention.

Referring now to FIG. 4, there is illustrated a block diagram of an exemplary encoder 215 in accordance with another embodiment of the present invention. In certain embodiment of the present invention, the encoder 215 can comprise an audio encoder 215A. Alternatively, in other embodiments of the present invention, the encoder 215 can comprise a video encoder 215V.

The encoder 215 can receive either compressed data or decompressed data. The encoder 215 comprises a transcoder 405 and a compression engine 410. The transcoder 405 transcodes the compressed data in accordance with a first compression format, to compressed data in accordance with another compression format suitable for the portable media player. The compression engine 410 receives decompressed data. The compression engine 410 compresses the data in accordance with another compression format that is suitable for use with the portable media player.

In certain embodiments of the present invention, wherein the encoder 215 comprises an audio encoder 215A, the transcoder 405 can comprise an audio transcoder and the compression engine 410 can comprise an audio compression engine. Alternatively, in certain embodiments of the present invention, wherein the encoder 215 comprises a video encoder 215V, the transcoder 405 can comprise a video transcoder and the compression engine 410 can comprise a video compression engine.

Figure 5:
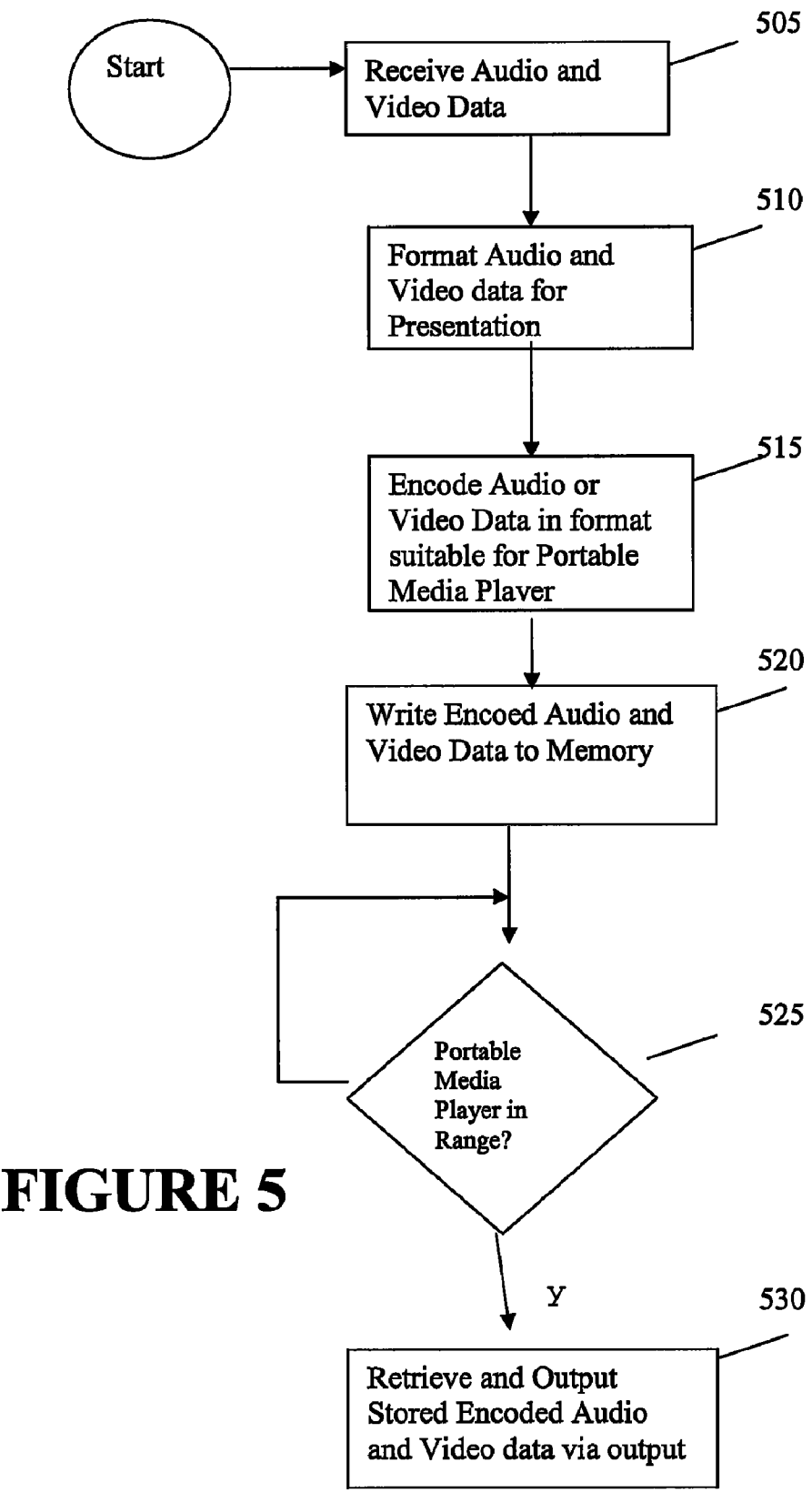
FIG. 5 is a flow diagram for transferring data in accordance with an embodiment of the present invention.

Referring now to FIG. 5, there is illustrated a flow diagram for transferring data in accordance with an embodiment of the present invention. At 505, the integrated circuit 105 receives audio and video data at one or more inputs 205.

At 510, one or more formatters 230 format the audio and video data for presentation. At 515, one or more encoders 215 encode the audio and video data into a format suitable for a portable media player. At 520, the one or more encoders 215 write the encoded audio and video data to memory 240.

Upon detection of a condition wherein the portable media player is proximate to the integrated circuit at 525, the memory controller 245 retrieves and outputs the stored encoded audio and video data via output 220 at 530.

While the invention has been described with reference to certain embodiments, it will be understood by those skilled in the art that various changes may be made and equivalents may be substituted without departing from the scope of the invention.

In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. An apparatus, said apparatus comprising:
   an integrated circuit for use in a personal video recorder, said integrated circuit comprising:
   at least one input for receiving video data;
   at least one output for providing video data to a display screen;
   an encoder for encoding the received video data into a particular compressed format; and
   at least another output for providing the encoded video data in the particular compressed format to an interface, wherein:
   the video data comprises compressed video data; and
   the encoder comprises a transcoder for transcoding the compressed video data to the particular format.

2. The apparatus of claim 1, and wherein the encoder further comprises:
   a decompression engine for decompressing the compressed video data; and
   a compression engine for compressing the video data into the particular compressed format.

3. The apparatus of claim 1, wherein the video data further comprises decompressed video data and wherein the encoder further comprises:
   a compression engine for compressing the decompressed video data.

4. The apparatus of claim 3, wherein the compression engine compresses the video data using motion compensation and entropy coding.

5. The apparatus of claim 1, wherein the integrated circuit for use in the personal video recorder, further comprises:
   a display engine for preparing the video data provided to the display screen, thereby resulting in rasterized video data.

6. The apparatus of claim 1, wherein the integrated circuit for use in the personal video recorder, further comprises:
   memory for storing the encoded video data in the particular compressed format; and
   wherein the video data provided to the display screen is decompressed from a different compressed format from the particular compressed format.

7. The apparatus of claim 6, wherein the integrated circuit for use in the personal video recorder, further comprises:
   a memory controller for providing the stored video data from the memory to the another output.

8. The apparatus of claim 7, wherein the memory controller provides the stored video data from the memory to the another output upon receiving a signal.

9. The apparatus of claim 1, wherein the integrated circuit for use in the personal video recorder, further comprises another input for receiving audio data.

10. The apparatus of claim 1, wherein the integrated circuit for use in the personal video recorder, further comprises:
a transceiver for transmitting the compressed data in the particular format.

11. The apparatus of claim 10, wherein the transceiver transmits the compressed data in the particular format after detecting that a personal media player is proximate to the integrated circuit but not connected to the integrated circuit.

12. An apparatus comprising:
an integrated circuit for use in a personal video recorder for providing audio data, said integrated circuit comprising:
at least one input for receiving audio data;
at least one output for providing the audio data to a transducer;
an encoder for encoding the audio data into a particular compressed format; and
at least another output for providing the audio data in the particular compressed format to an interface; and
wherein the audio data comprises compressed audio data and wherein the encoder further comprises a transcoder for transcoding the compressed audio data to the particular compressed format.

13. The apparatus of claim 12, wherein the encoder further comprises:
a decompression engine for decompressing the compressed audio data; and
a compression engine for compressing the audio data into the particular compressed format.

14. The apparatus of claim 12, wherein the audio data further comprises decompressed audio data and wherein the encoder further comprises:
a compression engine for compressing the decompressed audio data.

15. The apparatus of claim 12, wherein the compression engine compresses the audio data using inverse modified discrete cosine transformation.

16. The apparatus of claim 12, further comprising:
memory for storing the audio data in the particular compressed format.

17. The apparatus of claim 16, further comprising:
a memory controller for providing the stored audio data from the memory to the another output.

18. The apparatus of claim 17, wherein the memory controller provides the stored audio data from the memory to the another output upon receiving a signal.

19. An apparatus, said apparatus comprising:
a single integrated circuit, said integrated circuit comprising:
at least one input for receiving video data;
at least one output for providing the video data to a display screen;
an encoder for encoding the video data into a particular compressed format; and
at least another output for providing the video data in the particular compressed format to an interface, wherein:
the video data comprises compressed video data; and
the encoder further comprises a transcoder for transcoding the compressed video data to the particular format.

20. The apparatus of claim 19, wherein the video data comprises compressed video data and wherein the encoder further comprises:
a decompression engine for decompressing the compressed video data; and
a compression engine for compressing the video data into the particular compressed format.

* * * * *